United States Patent
Kudo et al.

(10) Patent No.: US 7,250,614 B2
(45) Date of Patent: Jul. 31, 2007

(54) RADIATION IMAGE CONVERSION PANEL

(75) Inventors: Shinji Kudo, Hino (JP); Takehiko Shoji, Hachioji (JP); Osamu Morikawa, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 117 days.

(21) Appl. No.: 11/010,726

(22) Filed: Dec. 13, 2004

(65) Prior Publication Data

US 2005/0098739 A1    May 12, 2005

Related U.S. Application Data

(63) Continuation-in-part of application No. 10/942,654, filed on Sep. 16, 2004.

(30) Foreign Application Priority Data

Sep. 25, 2003    (JP)    ............... 2003-332729

(51) Int. Cl.
G03B 42/08    (2006.01)
(52) U.S. Cl. .................... 250/484.4; 428/690
(58) Field of Classification Search ............. 250/484.4, 250/486.1; 428/690
See application file for complete search history.

(56) References Cited

U.S. PATENT DOCUMENTS

| | | | |
|---|---|---|---|
| 4,939,018 A * | 7/1990 | Kohda et al. ................ 428/192 |
| 4,947,046 A * | 8/1990 | Kawabata et al. ........ 250/484.4 |
| 5,866,204 A * | 2/1999 | Robbie et al. .............. 427/256 |
| 6,206,065 B1 * | 3/2001 | Robbie et al. .............. 156/349 |
| 6,992,305 B2 * | 1/2006 | Maezawa et al. ........ 250/484.4 |
| 7,018,789 B2 * | 3/2006 | Maezawa et al. ........... 430/496 |
| 7,029,836 B2 * | 4/2006 | Nakano et al. ............. 430/496 |
| 2002/0041977 A1 * | 4/2002 | Iwabuchi et al. ........... 428/690 |
| 2002/0066868 A1 | 6/2002 | Shoji et al. |
| 2002/0104974 A1 * | 8/2002 | Hosoi ......................... 250/584 |
| 2002/0195578 A1 * | 12/2002 | Yanagita et al. ............ 250/581 |
| 2003/0034458 A1 * | 2/2003 | Isoda et al. ............... 250/484.4 |
| 2003/0155529 A1 * | 8/2003 | Morikawa et al. ....... 250/484.4 |
| 2003/0160187 A1 * | 8/2003 | Nakano et al. .......... 250/484.4 |
| 2004/0026632 A1 * | 2/2004 | Struye et al. ............ 250/484.4 |
| 2005/0051737 A1 * | 3/2005 | Maezawa et al. ........ 250/484.4 |
| 2005/0121621 A1 * | 6/2005 | Kudo et al. .............. 250/484.4 |

* cited by examiner

Primary Examiner—David Porta
Assistant Examiner—Faye Boosalis
(74) Attorney, Agent, or Firm—Lucas & Mercanti, LLP

(57) ABSTRACT

A radiation image conversion panel comprising a phosphor sheet having a stimulable phosphor layer and a protective layer provided so as to cover the surface of the phosphor layer, wherein mean slope $\Delta a$ of an outer surface of the protective layer not adjacent with the phosphor layer is from 0.01 to 0.1 and the surface roughness Ra in μm of the inner side or the phosphor sheet side of the protective layer is 0.05 μm to 0.45 μm, and the stimulable phosphor layer is provided by a coating method.

12 Claims, 1 Drawing Sheet

RADIATION IMAGE CONVERSION PANEL

This application is a continuation-in-part application of U.S. patent application Ser. No. 10/942,654, filed on Sep. 16, 2004.

FIELD OF THE INVENTION

The present invention relates to a radiation image conversion panel employing a stimulable phosphor, and relates in detail to a radiation image conversion panel having a high resistivity against heat, by which an image with high sharpness and without unevenness of image density can be obtained.

BACKGROUND OF THE INVENTION

Radiographic images such typically as X-ray images are widely employed in various fields, for example, in the medical diagnosis. To obtain the X-ray image, radio-photographic method is principally utilized in which radiation penetrated through a subject is irradiated to a phosphor layer, also called as a phosphor screen, and light emitted from the phosphor layer is irradiated to silver halide photographic light-sensitive material and then the light-sensitive material is developed to obtain a visible image. Recently, however, new method for directly obtaining the image from the phosphor layer is proposed instead of the image forming method by the light-sensitive material.

In such the method, radiation penetrated through the subject is absorbed by a phosphor and then the phosphor is stimulated by light or thermal energy so as that the energy accumulated in the phosphor by absorbing the radiation is released as fluorescence and the fluorescence is detected and imaged. In concrete, the method is a radiation image conversion method utilizing a stimulable phosphor such as that described in U.S. Pat. No. 3,859,527 and Japanese Patent Publication Open to Public Inspection, hereinafter referred to as Japanese Patent O.P.I. Publication, No. 55-12144.

In this method, a radiation image conversion panel containing the stimulable phosphor is utilized. In detail, the radiation image conversion panel is exposed to radiation penetrated through the subject so that the radiation energy corresponding to the radiation transmission of each parts of the subject is accumulated in the stimulable phosphor, and then the energy of the radiation accumulated in the phosphor is emitted as light by time serially stimulating the phosphor by stimulating electromagnetic radiation such as visible light and infrared rays. The signal according to the variation of the emitted light is readout, for example, as electric signals by photo-electric conversion, and the electric signals are reproduced as a visible image on a usual image recording medium such as the light sensitive material or an image displaying apparatus typically such as a CRT.

The foregoing reproduction method for reproducing the radiographic image record has an advantage such as that a radiographic image with abundant information by an exposure amount of radiation considerably smaller than that to be required in the radio-photographic method employing a combination of the radiographic light-sensitive material and an intensifying screen.

On the outer surface of the stimulable phosphor layer, namely the surface not to be faced to the support, a protective layer for protecting the phosphor layer from a chemical deterioration or a physical impact. As the protective layer, the followings have been known: one formed by coating on the phosphor layer a solution composed of an organic polymer such as a cellulose derivative and poly(methyl methacrylate) dissolved in a suitable solvent; one formed by adhering a separately prepared protective layer forming sheet or film composed of an organic film such as polypropylene and poly(ethylene terephthalate) or a glass plate on the phosphor layer by a suitable adhering agent; and one formed by depositing an inorganic compound by a method such as vapor deposition.

The stimulable phosphor is a phosphor which emits light when irradiated by stimulating light after exposed to radiation. The phosphor emitting light of from 300 to 500 nm by stimulating light of from 400 to 900 nm is usually employed in practice. Examples of the stimulable phosphor employed hitherto in the radiation image conversion panel are alkali-earth metal fluoride-halide compound type phosphors each activated by a rare-earth element described on Japanese Patent O.P.I. Publication Nos. 55-12145, 55-160078, 56-74175, 56-116777, 57-23673, 57-23675, 58-206678, 59-27289, 59-27980, 59-56479 and 59-56480; di-valent europium-activated alkali-earth metal halide type phosphors described in 59-75200, 60-84381, 60-106752, 60-166379, 60-221483, 60-228592, 60-228593, 61-23679, 61-120882, 61-120883, 61-120885, 61-235486 and 61-235487; rare-earth element-activated oxohalide phosphors described in Japanese Patent O.P.I. Publication No. 59-12144; cerium-activated tri-valent metal oxohalide phosphors described in Japanese Patent O.P.I. Publication No. 58-69281; bismuth-activated alkali halide type phosphors described in Japanese Patent O.P.I. Publication No. 60-70484; di-valent europium-activated alkali-earth metal halo-phosphate phosphors described in Japanese Patent O.P.I. Publication Nos. 60-141783 and 60-157100; di-valent europium-activated alkali-earth halo-borate phosphors described in Japanese Patent O.P.I. Publication No. 60-157099; di-valent europium-activated alkali-earth hydrogen-halide phosphors described in Japanese Patent O.P.I. Publication No. 60-217354; cerium-activated rare-earth composite halide phosphors described in Japanese Patent O.P.I. Publication Nos. 61-21173 and 61-21182; cerium-activated rare-earth halo-phosphate phosphors described in Japanese Patent O.P.I. Publication No. 61-40390; di-valent europium-activated cerium rubidium phosphors described in Japanese Patent O.P.I. Publication No. 60-78151; di-valent europium-activated halogen phosphor described in Japanese Patent O.P.I. Publication No. 60-78153; and rare-earth metal-activated tetradecahedron alkali-earth metal fluoride-halide type phosphors precipitated from a liquid phase described in Japanese Patent O.P.I. Publication No. 7-233369.

Among the above-described stimulable phosphors, the di-valent europium-activated iodide-containing alkali-earth metal fluoride-halide type phosphors, the di-valent europium-activated iodide-containing alkali-earth metal halide type phosphors, the rare-earth metal-activated iodide-containing rare-earth metal oxohalide type phosphors, and the bismuth-activated iodide-containing alkali metal halide type phosphors each emit high luminance light.

It is one of the advantages of the radiation image conversion panel employing that the panel can be repeatedly usable because such the phosphor emits by scanning by the stimulating light and radiographic image can be re-accumulated thereafter. Such the method is also advantageous from the viewpoint of the resources protection and the economical efficiency since the radiation image conversion panel can be repeatedly usable contrary to that the radiographic light-sensitive material is consumed every once of the photographing in the usual radiographic method.

As described above, though the radiographic image recording-reproducing method has various advantages, it is demanded to the image conversion panel to be used in such the method that the sensitivity and the image quality such as the sharpness and the graininess are as higher as possible.

In the performance of the method, the radiation image conversion panel is repeatedly employed in the circle of exposure to radiation for recording the radiographic image, irradiation of the stimulating light for reading the recorded radiographic image and irradiation of erasing light for erasing the remained radiographic image. In a cassette type panel, the panel is conveyed through each steps by a conveying means such as a belt and a roller to perform such the repeatedly use of the panel. On the occasion of such the operation, the temperature of the interior of the apparatus is made higher than the room temperature by the presence of the light source and the driving system. In the case of an exclusive type apparatus, the temperature interior of the apparatus tends to be raised higher than that of the cassette type apparatus by heating by the light source in the course of continuous image taking even though there is no panel conveying means in the apparatus. It has been known that the unevenness of image density is degraded when heat is applied. Consequently, high resistivity against heat is required to the panel.

On the other hand, it has been considered that the sharpness of the image obtained by the radiation image conversion panel is higher when the thickness of the protective layer is thinner. However, the durability of the conversion panel tends to be lowered because the scratches and the cracks on the protective layer surface tend to be formed in the course of the repeatedly use when the thickness of the protective layer is thin. Therefore, suitable materials are elected so that the functions as the protective layer such as anti-scratch property and the conveying suitability can be maintained even when the thickness of the protective layer is made as small as possible for inhibiting the degradation of the sharpness. For example, the use of a material having a high strength and transparency such as poly(ethylene terephthalate), combination of plural kinds of resins, coating of a layer of a composition containing fluorine-containing resin having high anti-scratch ability and the use of multi-layered protective layer are applied.

However, the thickness of the protective layer should be increased in the usual technology to obtain the durability for prolonged period in the apparatus so that degradation of the sharpness is resulted.

Problems that unevenness of the density other than the density variation caused by the subject occurs when a film of polypropylene, poly(ethylene terephthalate) or poly(ethylene naphthalate) is used as protective layer, or the density unevenness caused by the coating of the resin composition containing fluorinated resin occurs. As the countermeasure to such the density unevenness, Japanese Patent O.P.I. Publication No. 59-42500 and Japanese Examined Patent Publication No. 1-57759 discloses a measure to disappear the density unevenness by raising the haze ratio of the protective layer. However, a drawback is caused that the increasing of the haze ratio results further lowering of the sharpness.

Consequently, a method described in, for example, Japanese Patent O.P.I. Publication No. 10-82899, in which the protective layer is constituted by a plastic film and a fluorinated resin-containing resin composition which contains light scattering fine particles coated on the film, and a method described in, for example, Japanese Patent O.P.I Publication No. 2002-122698, in which the protective film has a stimulating light absorbing layer and specified surface roughness, are disclosed. However, the improvement of the sharpness is insufficient and the compatibility of high sharpness and low density unevenness cannot be satisfied yet.

SUMMARY OF THE INVENTION

An object of the invention is to provide a radiation image conversion panel having high thermal resistivity and giving a radiographic image of high sharpness without density unevenness.

The above-described object can be attained by the followings.

1. A radiation image conversion panel comprising a phosphor sheet having a stimulable phosphor layer and a protective layer provided so as to cover the surface of the phosphor layer, wherein mean slope $\Delta a$ of an outer surface of the protective layer not adjacent with the phosphor layer is from 0.01 to 0.1 and the surface roughness Ra in µm of the inner side or the phosphor sheet side of the protective layer is 0.05 µm to 0.45 µm, and the stimulable phosphor layer is provided by a coating provided type.

2. The radiation image conversion panel described in 1, wherein the protective layer comprises a stimulating light absorbing layer being colored to absorb the stimulating light.

3. The radiation image conversion panel described in 1, wherein a binder to be used in the stimulable phosphor layer is selected from proteins such as gelatin, polysaccharide such as dextrin, natural polymers such as gum arabic, and synthesized polymers such as poly(vinyl butyral), poly(vinyl acetate), nitrocellulose, ethyl cellulose, vinylidene chloride-vinyl chloride copolymer, poly(alkyl acrylate), poly(alkyl methacrylate), vinyl chloride-vinyl acetate copolymer, polyurethane, cellulose acetate butylate, poly(vinyl alcohol) and linear polyester.

4. The radiation image conversion panel described in 3, wherein the binder is selected from nitrocellulose, linear polyester, poly(alkyl acrylate), poly(alkyl methacrylate), a mixture of nitrocellulose and linear polyester, a mixture of nitrocellulose and poly(alkyl acrylate) or poly(alkyl methacrylate) and a mixture of polyurethane and poly(vinyl butyral).

5. The radiation image-conversion panel of claim 1, wherein the ratio of the amount of the binder to be used in the stimulable phosphor layer to that of the stimulable phosphor is within the range of from 0.03 to 0.2 parts by weight per one part by weight of the stimulable phosphor.

6. The radiation image conversion panel described in 1, wherein the panel is composed of the phosphor sheet cut into a designated size and moisture proof films provided on both sides of the phosphor sheet and the films are each substantially not adhered with the phosphor sheet and the circumferences thereof are arranged at the outside of the circumference of the phosphor sheet so as to cover the entire surface of the phosphor sheet.

7. A radiation image conversion panel comprising a phosphor sheet having a stimulable phosphor layer and a protective layer provided so as to cover the surface of the phosphor layer, wherein mean slope $\Delta a$ of an outer surface of the protective layer not adjacent with the phosphor layer is from 0.01 to 0.1 and the surface roughness Ra in µm of the inner side or the phosphor sheet side of the protective layer is 0.05 µm to 0.45 µm, and the stimulable phosphor layer is provided by a gas phase accumulation type.

8. The radiation image conversion panel described in 7, wherein the protective layer comprises a stimulating light absorbing layer being colored to absorb the stimulating light.

9. The radiation image conversion panel described in 7, wherein the stimulable phosphor constituting the stimulable phosphor layer is alkali halide type stimulable phosphor represented by Formula 1:

$$M1X \cdot aM2X'_2 \cdot bM3X''_3 : eA \quad \text{Formula 1}$$

wherein M1 is an alkali metal selected from the group consisting of Li, Na, K, Rb and Cs; M2 is a divalent metal selected from the group consisting of Be, Mg, Ca, Sr, Ba, Zn, Cd, Cu and Ni; M3 is a trivalent metal selected from the group consisting of Sc, Y, La, Ce, Pr, Nd, Pm, Sm, Eu, Gd, Tb, Dy, Ho, Er, Tm, Yb, Lu, Al, Ga and In; X, X' and X" are each a halogen selected from the group consisting of F, Cl, Br and I; A is a metal selected from the group consisting of Eu, Tb, In, Cs, Ce, Tm, Dy, Pr, Ho, Nd, Yb, Er, Gd, Lu, Sm, Y, Tl, Na, Ag, Cu and Mg; and a, b and e are each a value within the range of $0 \leq a < 0.5$, $0 \leq b < 0.5$ and $0 < e \leq 0.2$, respectively.

10. The radiation image conversion panel described in 9, wherein the stimulable phosphor constituting the stimulable phosphor layer is represented by Formula 2:

$$CsX : A \quad \text{Formula 2}$$

in which X is Br or I, and A is Eu, In, Ga or Ce.

11. The radiation image conversion panel described in 10, wherein the stimulable phosphor constituting the stimulable phosphor layer is CsBr type phosphor.

12. The radiation image conversion panel described in 7, wherein the panel is composed of the phosphor sheet cut into a designated size and moisture proof films provided on both sides of the phosphor sheet and the films are each substantially not adhered with the phosphor sheet and the circumferences thereof are arranged at outside of the circumference of the phosphor sheet so as to cover the entire surface of the phosphor sheet.

DETAILED DESCRIPTION OF THE INVENTION

Figure 1:
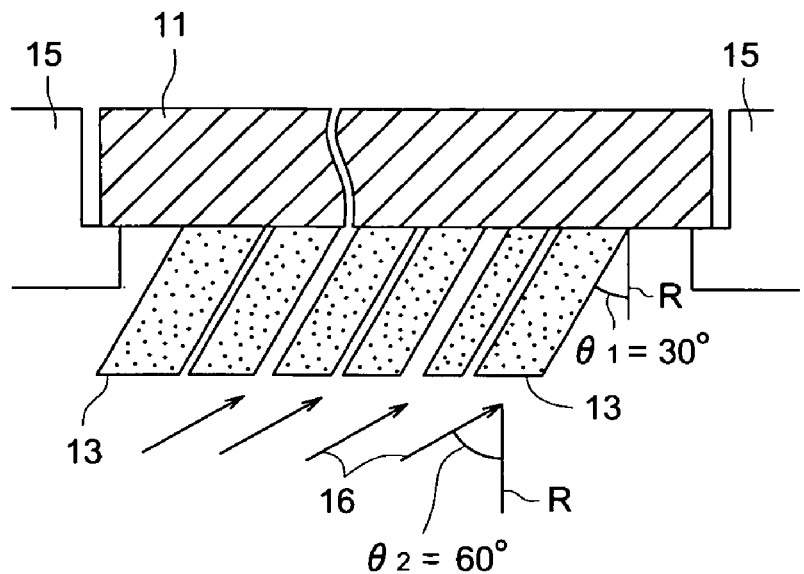
FIG. 1 shows the situation of formation of a stimulable phosphor layer on a support by vapor deposition.

The invention is described in detail below.

As the protective film according to the invention, polyester film, polymethacrylate film, nitrocellulose film, cellulose acetate film are employable, and film such as polypropylene film, poly(ethylene terephthalate) film and poly (ethylene naphthalate film are preferable as the protective film from the viewpoint of the transparence and the strength. As the fluorinated resin-containing resin composition layer, a layer of polymer of fluorine-containing olefin or fluoroolefin and that of copolymer containing the fluorine-containing as the copolymer ingredient are preferable from the viewpoint of the anti-scratch ability.

In the invention, mean slope Δa is an arithmetic mean slope Δa according to JIS-B-0660, 1998.

In addition, the international standard corresponding to the foregoing JIS-B-0660, 1998 is ISO 4287-1 (Surface roughness-Terminology-Part 1: Surface and its parameters). Note that mean slope Δa is expressed in the foregoing standard as shown below.

$$\Delta_a = \frac{1}{l} \int_0^l \left| \frac{dy}{dx} \right| dx$$

In the invention, a stimulating light absorbing layer is suitably employable, which is colored so as to absorb the stimulating light. The stimulating light absorbing layer is a layer containing a colorant selectively absorbing the stimulating light. Such the layer either may be coated on one side or both sided of the protective layer. The protective layer may be colored itself so as to function as the stimulating light absorbing layer.

The protective layer according to the invention may be formed by a transparent organic polymer such as the cellulose derivatives and poly(methyl methacrylate) or an organic polymer film such as that of polypropylene and poly(ethylene terephthalate) so as to have thickness suited to the required conveying durability. The organic polymer film is preferred from the viewpoint of the strength, and a layer of a resin composition containing fluorinated resin may be coated according to necessity.

To surely reduce an inroad of moisture into the phosphor sheet having the stimulable phosphor layer on the support which is cut into a designated sized, it is preferable that the circumferences of the water proof protective films provided on both sides of the phosphor sheet are outside of the circumference of the phosphor sheet and the protective films are adhered by fusing or a adhesive agent at the area outside the circumference of the phosphor sheet to form a sealed structure. By such the structure, the inroad of moisture from the circumference of the phosphor sheet can be also prevented.

For realizing such the sealed structure, it is preferable that the outermost surface of the side to be faced to the phosphor layer of the water proof protective film is constituted by a thermally fusible resin. By such the structure, the films provided on each sides of the phosphor sheet can be adhered by thermal fusion at the area outside the circumference of the phosphor sheet. Thus the working efficiency of sealing process can be raised.

The thermally adhesive fusible film in the invention is a resin film capable of adhering by thermal fusion, for example, a film of ethylene-vinyl acetate copolymer (EVA), that of polypropylene (PP) and that of polyethylene (PE). The kind of the film is not limited to the above examples.

When the fusible adhesive film is employed as the protective film, plural sheets of the film may be laminated to make the suitable moisture preventing ability adjusting to the required moisture preventing ability. Though any known method may be applied for laminating the films, a dry lamination method is preferable which is superior in the working efficiency.

As the method for increasing the average slant angle Δa of the surface roughness, a method in which a resin composition coating liquid containing fluorinated resin in which an inorganic material such as silica is dispersed is coated on the surface of the protective film, and a method in which plural sheets of film are laminated and the kind of film to be provided at the outermost surface of the laminated film is suitably selected are employable; but the method is not limited thereto.

Resin films each having various surface states are widely available on the market, and the film having required mean slope Δa can be easily selected.

The surface roughness Ra in μm of the inner side or the phosphor sheet side of the protective layer is an arithmetic average roughness Ra defined in the roughness shape parameter of JIS described in JIS-B-0601, 1994.

The surface roughness is easily controlled by selection of the roughness of the resin film to be used or providing a coating-layer containing an inorganic substance on the film surface. The coating layer can be colored for making the layer as the stimulating light absorbing layer. Recently, the resin film having an optional surface roughness can be easily available.

The film such as film of propylene, poly(ethylene terephthalate) and poly(ethylene naphthalate) has superior properties from the viewpoint of the strength as the protective film. However, a part of the incident stimulating light is repeatedly reflected between the upper and lower interfaces of the film and transmitted to the position far from the scanned point since such the film has high refractive index, and the transmitted stimulating light causes emission of the light from the stimulable phosphor at the position far from the scanned point. Consequently, the sharpness of the image is lowered. Furthermore, the stimulating light reflected by the upper or lower interface of the protective film in the direction opposite to the surface of the phosphor layer is further reflected at the light detection device or parts arranged around position, and the reflected light stimulates the stimulable phosphor at the position further far from the scanned point to cause light emission. Therefore, the sharpness is further lowered. The amount of the stimulating light absorbed in the protective film and the space in the reading apparatus is small because the stimulating light is coherent light having a long wavelength of from red to infrared. Accordingly, the stimulating light is transmitted to far position and degrades the sharpness as long as aggressively absorb the scattered and reflected light.

It is supposed that the stimulation light absorbing layer relating to the invention is effective to inhibit such the scattered and the reflected light.

When the film such as polypropylene film, poly(ethylene terephthalate) film or poly(ethylene naphthalate) film is used as the constituting member of the protective layer according to the invention, the unevenness of the image density or the density variation other than the radiographic image and line-shaped noises can also be reduced. It is supposed that the line-shaped noises are caused in the course of the production process of the protective film.

Such the effect is enhanced when mean slope Δa is not less than 0.01.

Though it is considered that the total reflection of the stimulating light at the interface of the protective layer is prevented near such the value of mean slope Δa, such the effect is small when the protective film has no stimulating light absorbing layer. Accordingly, it is supposed that the above-mentioned effect is the synergistic effect of the light scattering inhibition effect of the stimulating light absorbing layer with the total reflection inhibition effect of mean slope Δa.

By employing the present invention, the use of the protective film having high thermal resistivity and necessary thickness is made possible without degradation of the image quality. Consequently, the radiation image conversion panel excellent in the thermal resistivity for prolonged period can be realized.

When the resin film is employed as the protective film, the protective film may be constituted by lamination of plural resin films and resin films on which a metal oxide is vapor deposited.

In such the case, it is preferable to provide the stimulating light absorbing layer between the laminated resin films. By such the constitution, the stimulating light absorbing layer is protected from the physical impact and the chemical degradation and the properties of the panel are stably maintained for a long period. It may be either that the stimulation light absorbing layers are arranged at plural positions or that the adhesive layer for laminating the resin films contains a colorant so as to be the stimulating light absorbing layer.

Though the adhesion of the protective film and the phosphor sheet may be performed by any known method, a method is simple for the production work, in which an adhesive agent is previously coated on the side of the protective film to be contacted to the phosphor sheet and the protective film is adhered by thermal fusion onto the phosphor sheet by the use of a heating roller.

The shape of the surface of the protective film can be easily controlled by selecting the resin film to be employed or coating a layer containing an inorganic substance on the surface thereof. It is possible to color the coating layer to form the stimulating light absorbing layer. Recently, a resin film having an optional surface shape can be easily available.

The method for raising the sharpness by coloring the protective film of the radiation image conversion layer is described in Japanese Patent Examined Publication No. 59-23400 as an example of the embodiments including the coloring the support, subbing layer, phosphor layer, interlayer and the protective layer. However, there is neither concrete description nor suggestion regarding the protective layer.

Colorants capable of absorbing the stimulating light for the radiation image conversion layer are employed as the colorant to be employed in the protective film of the radiation image conversion layer according to the invention.

It is preferable to provide the stimulating light absorbing layer so that the light transmittance of the protective layer at the wavelength of the stimulating light is from 98% to 50% of that of the same protective layer except that the stimulating layer absorbing layer is omitted. When the ratio is more than 98%, the effect of the invention is small and when the ratio is less than 50%, the illuminance of the radiation image conversion layer is considerably lowered.

The kind of the colorant to be employed is decided depending on the kind of the stimulable phosphor. As the stimulable phosphor for the radiation image conversion panel, one emitting light of from 300 to 500 nm by stimulation by stimulating light of from 400 to 900 nm is usually employed. Therefore, blue to green organic or inorganic colorants are usually employed.

Examples of the blue to green organic colorant include Sabon Fast Blue 3G manufactured by Hoechst Co., Ltd., Estrol Bril Blue N-3RL manufactured by Sumitomo Kagaku Co., Ltd., Sumiacryl Blue F-GSL manufactured by Sumitomo Kagaku Co., Ltd., D & C Blue No. 1 manufactured by National Aniline Co., Ltd., Spirit Blue manufactured by Hodogaya Kagaku Co., Ltd., Oil Blue No. 603 manufactured by Orient Co., Ltd., Quitone Blue A manufactured by Ciba-Geigy Co., Ltd., Aizen Carotin Blue GLH manufactured by Hodogaya Kagaku Co., Ltd., Lake Blue A, F and H manufactured by Kyouwa Sangyo Co., Ltd., Rhodarin Blue 6GH manufactured by Kyouwa Sangyo Co., Ltd., Primo Cyanine 6GX manufactured by Inahata Sangyo Co., Ltd., Bril Acid Green 6BH manufactured by Hodogaya Kagaku Co., Ltd., Cyanine Blue BNRS manufactured by Toyo Ink Co., Ltd., and Lyonol Blue SL manufactured by Toyo Ink Co., Ltd. Examples of blue to green inorganic colorant include Prussian blue, cobalt blue, cerulean blue, chromium oxide, and $TiO_2$—ZnO—CoO—NiO type pigments.

As the support to be employed in the radiation image conversion panel according to the invention, ones capable of being made as a flexible sheet or a web are suitable for easiness of handling. From such the viewpoint, a plastic film such as cellulose acetate film, polyester film, poly(ethylene terephthalate) film, poly(ethylene naphthalate) film, polyamide film, polyimide film, triacetate film and polycarbonate film is preferred.

Though the thickness of the support may be varied depending on the kind of the material of the support, the thickness is usually from 80 μm to 1,000 μm and preferably from 80 μm to 500 μm.

The surface of the support may be either smooth or matted for raising the adhesiveness with the stimulable phosphor layer.

On the surface of the support, on which the stimulable phosphor is provided, a subbing layer may be formed for increasing the adhesiveness with the stimulable phosphor layer.

Case of coating type stimulable phosphor layer

The coating type stimulable phosphor layer is the stimulable phosphor layer of the phosphor sheet formed by coating a coating liquid.

Examples of the binder to be employed in the stimulable phosphor include proteins such as gelatin, polysaccharides such as dextran, natural polymer substances such as gum arabic, and synthesized polymer substances typically such as poly(vinyl butyral), poly(vinyl acetate), nitrocellulose, ethyl cellulose, vinylidene chloride-vinyl chloride copolymer, a poly(alkyl acrylate), a poly(alkyl methacrylate), vinyl chloride-vinyl acetate copolymer, polyurethane, cellulose acetate butylate, poly(vinyl alcohol) and a linear polyester.

Among these binder, nitrocellulose, linear polyester, poly(alkyl acrylate), poly(alkyl methacrylate), a mixture of linear polyester and poly(alkyl acrylate) or poly(alkyl methacrylate) and a mixture of polyurethane and poly(vinyl butyral) are particularly preferred. These binders may be crosslinked by a crosslinking agent. The stimulable phosphor layer can be formed on the subbing layer by, for example, the following method.

The stimulable phosphor and the binder are added to a suitable solvent and sufficiently mixed to prepare a coating liquid composed of solution of the particles of the binder and that of the stimulable phosphor uniformly dispersed in the binder solution.

The binder is usually employed in a ratio of from 0.01 to 1 part by weight per 1 part by weight of the stimulable phosphor. The amount of the binder is preferably to be smaller from the viewpoints of the sensitivity and the sharpness of the radiation image conversion panel, and a ratio of from 0.03 to 0.2 parts by weight is preferable based on the balance with the easiness of the coating.

Examples of the solvent to bemused for preparation of the coating liquid of the stimulable phosphor layer are lower alcohols such as methanol, ethanol, iso-propanol and n-butanol; ketones such as acetone, methyl ethyl ketone, methyl iso-butyl ketone and cyclohexanone; esters of a lower fatty acid and a lower alcohol such as methyl acetate, ethyl acetate and n-butyl acetate; ethers such as dioxane, ethylene glycol monoethyl ether and ethylene glycol monomethyl ether; aromatic compound such as toluene and xylene; halogenized hydrocarbon such as methylene chloride and ethylene chloride; and a mixture the above-mentioned.

Various kinds of additive such as a dispersing agent for improving the dispersing ability of the phosphor in the coating liquid and a plasticizer for binding force between the binder and the phosphor in the stimulable phosphor layer may be mixed with the coating liquid. Examples of the dispersing agent to be used such the purpose include phthalic acid, stearic acid, caproic acid and lipophilic surfactants. Examples of the plasticizer include phosphates such as triphenyl phosphate, tricresyl phosphate and diphenyl phosphate; phthalates such as diethyl phthalate and dimethoxyethyl phthalate; glycolates such as ethyl phthalyl ethyl glycolate and butyl phthaly butyl glycolate; and polyesters of poly(ethylene glycol) with an aliphatic dibasic acid such as polyester of triethylene glycol with adipic acid and polyester of diethylene glycol with succinic acid.

The preparation of the stimulable phosphor layer coating liquid is performed using a dispersing apparatus such as a ball mill, a sand mill, an attriter, a three-roller mill, a high speed impeller disperser, a Kady mill and a ultrasonic dispersing apparatus.

The above-prepared coating liquid is coated on the subbing layer to form a coated layer of the coating liquid. The coating can be performed by utilizing usual coating means such as a doctor blade coater, a roller coater and a knife coater.

The coated layer thus formed is gradually heated to be dried so that the formation of the stimulable phosphor layer is completed. The thickness of the stimulable phosphor layer is usually from 20 μm to 500 μm, even though the thickness may be varied depending on the objective properties of the radiation image conversion panel, the kind of the stimulable phosphor and the mixing ratio of the binder to the phosphor. The total thickness of the stimulable phosphor, subbing layer and the support, is preferably from 50 μm to 3 mm. Case of gas phase accumulated type stimulable phosphor layer The gas phase accumulated type means that the stimulable phosphor layer of the phosphor sheet is formed by accumulation of the phosphor in the gas phase by vapor deposition.

<Stimulable Phosphor>

As the stimulable phosphor for forming the stimulable phosphor layer, composite halide phosphors activated by di-valent europium described in Japanese Patent O.P.I. Publication No. 61-236890 are usable. For example, iodide-containing rare-earth metal oxohalide compound phosphors each activated by a rare-earth element, particularly Eu added BaFI compound are usable. Examples of the stimulable phosphor preferably employed in the radiation image conversion panel are phosphors represented by $BaSO_4$:Ax described in Japanese Patent O.P.I. Publication No. 48-80487; phosphors represented by $MgSO_4$:Ax described in Japanese Patent O.P.I. Publication No. 48-80488; phosphors represented by $SrSO_4$:Ax described in Japanese Patent O.P.I. Publication No. 48-80489; phosphors of $Na_2SO_4$, $CaSO_4$, $Na_2SO_4$ and $BaSO_4$, each added with at least one of Mn, Dy, and Tb described in Japanese Patent O.P.I. Publication No. 51-19889; phosphors of BeO, LiF, $MgSO_4$ and $CaF_2$ described in Japanese Patent O.P.I. Publication No. 52-30487; phosphors of $Li_2B_4O_7$:Cu,Ag described in Japanese Patent O.B.I. Publication No. 53-39277; phosphors of $Li_2O$ $(Be_2O_2)_x$:Cu,Ag described in Japanese Patent O.P.I. Publication No. 54-47883; and phosphors represented by SrS:Ce,Sm, SrS:Eu,Sm, $La_2O_2S$:Eu,Sm, and $(Zn,Cd)S$:$Mn_x$, described in U.S. Pat. No. 3,859,527. Moreover, Phosphors of ZnS:Cu,Pb described in Japanese Patent O.P.I. Publication No. 55-12142; barium aluminate phosphors represented by BaO.x Al₂O₃:Eu and alkali-earth metal silicate represented by M(II)O.xSiO₂:A are employable.

Examples of the phosphor preferably used in the invention are followings: alkali-earth metal fluoride halide phosphors represented by $(Ba_{1-x-y}Mg_xCa_y)F_x:Eu^{2+}$ described in Japanese Patent O.P.I. Publication No. 55-12143; phosphors represented by LnOX:xA described in Japanese Patent O.P.I. Publication No. 55-12144; phosphors represented by $(Ba_{1-x}M(II)_xF_x:yA$ described in Japanese Patent O.P.I. Publication No. 55-12145; phosphors represented by BaFX:xCe described in Japanese Patent O.P.I. Publication No. 55-84389; phosphors of rare-earth metal-activated di-valent metal fluorohalide represented by M(II)FX.xA:yLn described in Japanese Patent O.P.I. Publication No. 55-160078; phosphors represented by ZnS:A, CdS:A or (Zn,Cd)S:A,X: phosphors represented by one of the followings described in Japanese Patent O.P.I. Publication No. 59-38278

$xM_3(PO_4)_2.NX_2:yA$ $xM_3(PO_4)_2:yA;$ phosphors represented by one of the followings described in Japanese Patent O.P.I. Publication No. 59-155487

$nReX_3.mAX'_2:xEu$ $nReX_3.mAX'_2:xEu, ySm;$ and bismuth-activated alkali halide phosphors represented by M(I)X:xBi described in 61-228400.

Alkali halide type stimulable phosphors represented by the following Formula 1 such as those described in Japanese Patent O.P.I. Publication Nos. 61-72087 and 2-58000 are particularly preferred.

$M1X.aM2X'_2bM3X''_3:eA$     Formula 1

In the above formula, M1 is an alkali metal selected from the group consisting of Li, Na, K, Rb and CS; M2 is a di-valent metal selected from the group consisting of Be, Mg, Ca, Sr, Ba, Zn, Cd, Cu and Ni; M3 is a tri-valent metal selected from the group consisting of Sc, Y, La, Ce, Pr, Nd, Pm, Eu, Gd, Tb, Dy, Ho, Er, Tm, Yb, Lu, Al, Ga and In; X, X' and X" are each a halogen selected from the group consisting of F, Cl, Br and I; A is a metal selected from the group represented by the group consisting of Eu, Tb, In, Ga, Cs, Tm, Dy, Pr, Ho, Nd, Yb, Er, Gd, Lu, Sm, Y, Tl, Na, Ag, Cu and Mg; and a, b and e are each a value within the range of $0 \leq a < 0.5$, $0 \leq b < 0.5$ and $5.0 < e \leq 0.2$, respectively.

In Formula 1, M1 is preferably selected from the group consisting of K, Rb and Cs and X is preferably elected the group consisting of from Br and I.

M2 is preferably selected from the group consisting of Be, Mg, Ca and Ba; M3 is preferably selected from the group consisting of Y, Ce, Sm, Eu, Al, La, Gd, Lu, Ga and In; b is preferably $0 \leq b \leq 0.01$; and A is preferably selected from the group consisting of Eu, Cs, Sm, Tl and Na.

These alkali halide type phosphors each forms slender columnar crystals on the substrate by a gas phase accumulation method, which have a slant of certain angle with the substrate. The angle of the crystals may be vertical to the substrate. It is a feature of the use of such the phosphor that the sharpness of the image is high because the diffusion of the stimulating light or the emitted light in the sideway direction is inhibited by the formation of such the columnar crystals. Among the alkali halide type stimulable phosphors, RbBr and CsBr type phosphor are preferable since they give high illuminance and high image quality.

In the invention, the phosphors represented by the following Formula 2 are particularly preferred.

CsX:A     Formula 2

In the formula, Br is Br or I, and A is Eu, In, Ga or Ce.

Among them, CsBr type phosphors are preferable since they emit high illuminance light and give a high quality image, and shows high improving effect on the adhesiveness with the substrate according to the producing method relating to the invention.

In the invention, the preferable columnar crystals in which the crystals are individually grown in a columnar shape having certain space between them, can be formed by the method described in Japanese Patent O.P.I. Publication No. 2-58000.

The stimulable phosphor layer composed of independent slender columnar crystals can be obtained by the gas phase growing or accumulation method such as a vapor deposition method.

For example, the columnar crystals approximate vertically grown from the substrate can be obtained by hitting the vapor stream to the substrate with an angle of from 0° to 5° with the substrate surface.

In such the case, it is suitable that the shortest distance between the substrate and the crucible is set about from 10 cm to 60 cm for suiting the average range of the vapor of the stimulable phosphor.

The stimulable phosphor as the evaporation source is charged in the crucible in uniformly molted state or in a shaped state by pressing or hot pressing. A degas treatment is preferably applied on this occasion. Though the evaporation of the stimulable phosphors from the evaporation source is carried out by scanning by an electron beam generated by an electron gun, the evaporation may be performed by another method.

It is necessary not always that the evaporation source is the stimulable phosphor, it may be a mixture of the raw materials of the stimulable phosphor.

The activator may be added by depositing the mixture of the basic substance and the activator or doping the activator after the deposition of the basic substance. For example, in the case of CsBr is employed as the basic substance, CsBr is solely vapor deposited and In is doped as the activator. The doping is possible even when the thickness of the layer is large since the crystals are each independent and the MTF is not lowered because the growing the crystals is difficultly occur.

The doping can be performed by thermal diffusion or ion injection into the layer of the basic substance of the phosphor.

<Thickness of Phosphor Layer and the Size of Crystal>

The thickness of the layer constituted by the columnar crystals formed by the above-described method is preferably 50 μm to 1,000 μm and more preferably from 50 μm to 800 μm even though the thickness may be varied according to the sensitivity to the radiation of the objective radiation conversion panel and the kind of the stimulable phosphor.

For improving the modulation transfer function (MTF) of the stimulable phosphor layer composed of the columnar crystals, the size of the columnar crystal is preferably about from 0.5 to 50 μm and more preferably from 0.5 to 20 μm. The size of the crystals is the average value of the circle-equivalent diameter of each of the columnar crystals observed from the face parallel with the substrate, which is determined by a microscopic photograph including at least 100 of the columnar crystals. When the columnar crystal is thinner than 0.5 µm, the emitted light is scattered by the crystals and lowering of the MTF is resulted, and when columnar crystal is thicker than 50 µm, the directivity of the emitted light is lowered and lowering of the MTF is also resulted.

For gas phase growing or accumulating the stimulable phosphor, the vapor depositing method, spattering method and chemical vapor deposition (CVD) method are applicable.

In the vapor deposition method, the substrate or support is set in a vapor deposition apparatus and air in the apparatus is exhausted while introducing inactive gas from the introducing opening to make the vacuum degree to about 1.333 Pa to $1.33 \times 10^{-3}$ Pa. And then at least one of the stimulable phosphor is heated and evaporated by a resistor heating method or an electron beam method to accumulate the phosphor until designated thickness. Thus the stimulable phosphor layer containing no binder is formed. It is possible in the vapor deposition process that the formation of the stimulable phosphor layer is separated plural times. In the vapor deposition process, plural resistor heating devices or electron beams may be applied to perform the vapor deposition. It is also possible in the vapor deposition method that the raw materials of the stimulable phosphor are evaporated by plural resistor heating devices or electron beams so that the objective stimulable phosphor is synthesized on the support while forming the stimulable phosphor. The support or substrate may be heated or cooled according to necessity in the vapor deposition method. A heating treatment may be applied after the deposition.

In the spattering method, the substrate is set in a spattering apparatus similar in the case of the vapor deposition method, and air in the apparatus is exhausted and then inactive gas such as Ar and Ne is introduced in the apparatus to make the pressure in the apparatus to about 1.33 Pa to $1.33 \times 10^{-3}$ Pa. And then spattering is performed on the stimulable phosphor as the target to accumulate the phosphor on the substrate to a desired thickness. In the spattering process, the spattering can be separated into plural times as the same as in the vapor deposition method. The stimulable phosphor layer may be formed by spattering the target using each of them. It is also possible in the spattering method to form the objective stimulable phosphor layer on the substrate by successively or simultaneously spattering plural raw materials of the stimulable phosphor, and reactive spattering may be performed by introducing gas such as $O_2$ or $H_2$ according to necessity. In the spattering method, the substrate may be heated or cooled on the occasion of the spattering according to necessity. A heating treatment may be applied after the spattering.

The CVD method is a method in which the stimulable phosphor or an organic metal compound is decomposed by energy such as heat or high frequency electric power to form the stimulable phosphor layer without binder on the substrate. By such the method, the independent slender columnar crystals of the stimulable phosphor can be grown at a designated angle with the normal line direction of the substrate in gas phase.

These columnar crystals can be obtained by the method described in Japanese Patent O.P.I. Publication No. 2-58000 in which the stimulable phosphor or the raw materials thereof are supplied in a state of vapor to grow or accumulate the crystals in gas phase.

FIG. 1 shows the situation of formation of the stimulable phosphor layer on the support 11 by the vapor deposition. In the drawing, $\theta_2$ is the incident angle of the vapor stream 16 of the stimulable phosphor with the normal line direction R of the support and $\theta_1$ is the angle of the columnar crystal with the normal line direction R of the support; the columnar crystal 13 is grown at this angle $\theta_1$. In the drawing, $\theta_2$ is 60° and $\theta_1$ is approximately 30°; empirically, the growing angle $\theta_1$ becomes about half of the incident angle $\theta_2$.

The stimulable phosphor layer formed on the support 11 by such the method is excellent in the directivity of the stimulating light and the emitted light since it contains no binder. Consequently, the thickness of the layer can be made thicker than that of the radiation image conversion panel having a dispersion type stimulable phosphor layer in which the stimulable phosphor is dispersed in the binder. Furthermore, scattering of the emitted light in the stimulable phosphor layer is reduced so that the sharpness of the image improved.

The space between the columnar crystals may be filled by filler to strengthen the stimulable phosphor layer. A substance having high light absorbing ability and that having a high reflective index may be filled in the space between the columnar crystals. Such the filling is effective to strengthen of the layer and to reduce of the diffusing of the incident stimulating light in the sideways direction.

The high reflective substance is a substance having high reflectivity to the stimulating light of from 500 to 900 nm, particular from 600 to 800 nm, for example, metals such as aluminum, magnesium, copper and indium, white pigments and colorants of green to red region can be employed.

The white pigment can also reflect the stimulating light. Examples of the white pigment are anatase and rutile type $TiO_2$, MgO, $PbCO_3.Pb(OH)_2$, C, $Al_2O_3$, M(II)FX in which M(II) is at least one of Ba, Sr and Ca and X is at least one of Cl and Br, $CaCO_3$, ZnO, $Sb_2O_3$, $SiO_2$, $ZrO_2$, lithopone ($BaO_4.ZnS$), magnesium silicate, basic lead silicate-sulfate, basic leas phosphate and aluminum silicate. These white pigments easily scatter the emitted light by reflecting and refracting the light since the refracting index thereof is high and the sensitivity of the radiation image conversion panel thus obtained is considerably increased.

As the substance with high absorbency, for example, carbon, chromium oxide, nickel oxide, iron oxide and blue colorants are employed. Carbon absorbs the emitted light also.

The colorant is may be either an inorganic or an organic corolant. Examples of the organic colorant are Sabon Fast Blue 3G manufactured by Hoechst Co., ltd., Estrol Bril Blue N-3RL manufactured by Sumitomo Kagaku Co., ltd., D & C Blue No. 1 manufactured by National Aniline Co., ltd., Spirit Blue manufactured by Hodogaya Kagaku Co., ltd., Oil Blue No. 603 manufactured by Orient Co., ltd., Quitone Blue A manufactured by. Ciba-Geigy Co., ltd., Aizen Carotin Blue GLH manufactured by Hodogaya Kagaku Co., ltd., Lake Blue AFH manufactured by Kyouwa Sangyo Co., ltd., Primo Cyanine 6GX manufactured by Inahata Sangyo Co., ltd., Bril Acid Green 6BH manufactured by Hodogaya Kagaku Co., ltd., Cyan Blue BNRCS manufactured by Toyo Ink Co., ltd., and Leionoyl Blue SL manufactured by Toyo Ink Co., ltd. Organic metal complex colorants such as Color Index Nos. 24411, 23160, 74180, 74200, 22800, 23154, 23155, 24401, 14830, 15050, 15760, 15707, 17941, 74220, 13425, 13361, 13420, 11836, 74140, 74380, 74350 and 74460 are also usable.

As the inorganic colorants, Prussian blue, cobalt blue, cerulean blue, chromium oxide and $TiO_2$—ZnO—Co—NiO type pigments are cited.

The thickness of the stimulable phosphor layer of the radiation image conversion panel is preferably from 10 μm to 1,000 μm and more preferably from 10 μm to 500 μm even though the thickness can be varied depending on the characteristics of the objective radiation image conversion panel, the kind of the stimulable phosphor and the mixing ratio of the binder and the stimulable phosphor.

The phosphor sheet composed of the support on which the phosphor layer is provided was cut into a designated size. Though the cutting may be performed by any method, the use of a trimming machine or a punching machine is desirable from the viewpoints of the working efficiency and the cutting accuracy.

EXAMPLES

The invention is described in detail below referring examples; the embodiment is not limited to the examples.

Example 1

<<Preparation of Radiation Image Conversion Panel>>

(Preparation of Coated Type Stimulable Phosphor Layer)

To methyl ethyl ketone, 200 g of stimulable phosphor ($BaFBr_{0.85}I_{0.15}:Eu^{2+}_{0.001}$), 8.0 g of polyurethane resin (Pandex T5265 manufactured by Dainihon Ink Kagaku Kogyo Co., Ltd.) and 2.0 g of epoxy resin (EP1001 manufactured by Yuka Shell Epoxy Co., Ltd.) as a yellowing preventing agent were added and dispersed by a propeller mixer to prepare a coating liquid for forming a phosphor layer having a viscosity of 30 Pa.s at 25° C. The coating liquid was coated on poly(ethylene terephthalate) film having a thickness of 300 μm and dried. Thus a stimulable phosphor sheet which had a stimulable phosphor layer having a thickness of 230 μm was obtained.

(Preparation of Gas Accumulated Type Stimulable Phosphor Layer)

Figure 2:
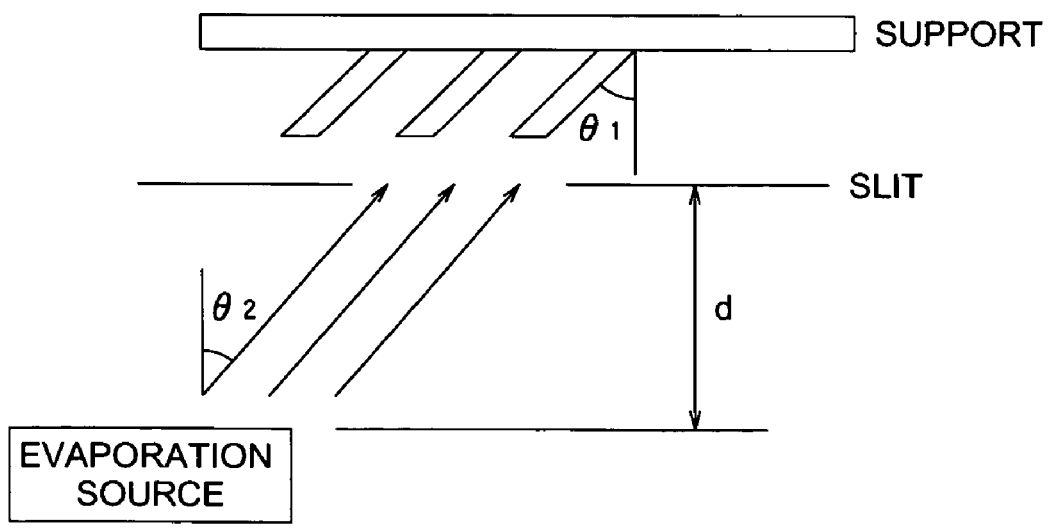
FIG. 2 shows a schematic drawing an example of method for forming the stimulable phosphor layer on the support by the vapor deposition.

On the surface of a crystalline glass palate, manufactured by Nihon Denki Glass Co., Ltd., having a size of 410 mm×410 mm and a thickness of 1 mm, a stimulable phosphor layer comprising a stimulable phosphor of CsBr:Eu was formed by employing the gas phase accumulation apparatus shown in FIG. 2.

On the occasion of the vapor deposition, the support was set in the gas phase accumulation apparatus and the raw material of CsBr:Eu shaped by pressing was charged into a crucible cooled by water, not shown in the drawing, as the evaporation source.

Thereafter, a pump was connected to the exhausting opening and air in the apparatus was exhausted, and nitrogen was introduce from the gas introducing opening with a introducing rate of 1,000 sccm (sccm: standard cc/min or $1×10^{-6}$ m³/min) to maintain the vacuum degree in the apparatus at $6.65×10^{-3}$ Pa. Then the evaporation source was heated by 650° C so that the alkali halide of $CsBr:Eu_{0.0001}$ layer was formed on a side of the support. On the occasion of the vapor deposition, the evaporation source was positioned on the normal line of the support surface, namely $θ_2$ was about 0°, and the distance d between the support and the evaporation source was set at 60 cm. The deposition was carried out while the support was conveyed in the direction parallel with the support. The deposition was finished when the thickness of the stimulable phosphor layer is attained at 400 μm to prepare a sample of the stimulable phosphor sheet.

(Preparation of Protective Film 1)

Poly(ethylene terephthalate) (PET) films each having the average slant angle shown in Tale 1 were used as the protective film of the phosphor sheet. On the side of the PET film an adhesive layer of 1 μm was provided by coating an adhesive agent, Vylon 300 manufactured by Toyobo Co., Ltd.

On the other side of the PET film, emitted light absorbing layers having various surface roughnesses as shown Table 1 were coated by the following method.

(Preparation of Emitting Light Absorbing Layer)

To methyl ethyl ketone, 50 g of fluorinated resin (50 weight percent xylene solution of fluoroolefin-vinyl ether copolymer Lumifron LF100 manufactured by Asahi glass Co., Ltd.), 5 g of a crosslinking agent of isocyanate (Coronate HX manufactured of Nihon Polyurethane Co., Ltd., having a solid content of 100% by weight) and 0.5 g of alcohol-modified silicone oligomer having a skeleton of dimethylpolysiloxane and hydroxyl groups (carbinol groups) at both of the terminals (X-22-2809 manufactured by Shin'etsu Kagaku Kogyo Co., Ltd.) were added to prepare a coating liquid having a viscosity of from 0.1 to 0.3 Pa.s. To the coating liquid, a previously prepared dispersion of a mixture of an organic blue colorant (Sabon Fast Blue 3G manufactured by Hoechst Co., Ltd.) and silica having a diameter of from 0.2 to 2.0 μm was added. And then the coating liquid was coated on the surface of the PET film and the coated layer was thermally hardened by a heat treatment at 120° C. for 20 minutes to form an emitting light absorbing layer.

On this occasion, emitted light absorbing layers each having optional surface roughness and the light transmittance were prepared by controlling the adding amount of the colorant and the silica. The light transmittance of the emitting light absorbing layer is a relative value of the transmittance to light of 633 nm generated by a He—Ne laser to that of the protective layer the same as the sample except that the emitted light absorbing layer is omitted.

(Protective Film 2)

As the protective film for the phosphor layer side of the phosphor sheet, a film having the following constitution A was used.

Constitution A

Matted film/VMPET 12/sealant film 30

In the above:

Matted film: various films having matted surface (available on the market)

VMPET film: Alumina deposited PET film (Toyo Metalizing Co., Ltd., available on the market)

Sealant film: Thermal fusion adhesive film made by casting polypropylene (CPP)

The number attached after the resin film name is the thickness of the film in μm.

In the above, "/" means the presence of a layer of an adhering agent having a thickness of 2.5 μm. The adhering agent was two-liquid type reactive urethane adhering agent for dry lamination.

The entire layers of the adhering agent were made as emitted light absorbing layers by adding an organic blue colorant, Sabon Fast Blue 3G manufactured by Hoechst Co., Ltd., previously dispersed and dissolved in methyl ethyl ketone.

Laminated protective films each having various surface roughness were prepared by controlling mean slope Δa of the surface roughness by changing the kind of the matted film and by selecting the surface roughness Ra of the sealant film.

(Protective Film for Support Side of Phosphor Sheet: Preparation of Backside Protective Film)

The protective film for the support side of the phosphor sheet was a dry laminated film having the constitution of sealant film/aluminum foil film/poly(ethylene terephthalate) film of 188 μm. The thickness of the adhering agent was 1.5 μm and the adhering agent was two-liquid type reactive urethane adhesive agent.

(Sealing of Phosphor Sheet)

The above prepared phosphor sheets were each cut into a square of 45 cm×45 cm and sandwiched between the protective films 1 and 2, and the circumference of them was fused and adhered by an impulse sealer in an atmosphere of reduced pressure.

The distance of from the adhered portion to the edge of the phosphor sheet was 1 mm. The width of the heated of the impulse sealer was 8 mm.

Radiation image conversion panels 1 through 21 were prepared as above-described.

<<Evaluation of Radiation Image Conversion Panel>>

Radiation conversion panels 1 through 21 prepared as above were subjected to the following evaluations.

1) Evaluation of Sharpness

The sharpness was evaluated as follows: The radiation image conversion panel was exposed to X-ray of 80 kVp of bulb voltage through a MTF chart of lead and then stimulated by He—Ne laser light of 633 nm to emit light. The light emitted from the phosphor sheet was received by a light receiving device, a photomultiplier having spectral sensitivity S-5, and converted to electric signals. The electric analogue signals were converted to digital signals and recorded in a hard disc. The record was analyzed by a computer to determine MTF of the X-ray image. In Table 1, the MTF values at a space frequency of 1 cycle/mm are shown. Higher value of the MFT corresponds to higher sharpness.

2) Evaluation of Unevenness of Image Density and Line-Shaped Noise

The radiation image conversion panel was exposed to X-ray of 80 kVp of bulb voltage and then stimulated by He—Ne laser light of 633 nm to emit light. The light emitted from the phosphor sheet was received by a light receiving device, a photomultiplier having spectral sensitivity S-5, and converted to electric signals. The signals was reproduced by an image reproducing apparatus and printed out as an image enlarged by to times by an output apparatus. Occurrence of the unevenness of the image density and the line-shaped noise were evaluated by visual observation of the printed out image. The unevenness of image density and the line-shaped noise were classified according to the following norms and shown in Table 1.

The samples subjected to accelerated test in an oven at 80° C. for 2 days were evaluated in the same manner as above for evaluating the thermal resistivity.

A: Unevenness of image density and the line-shaped noise are not observed at all.

B: One or two weak unevenness of image density or line-shaped noise are observed in the image.

C: Three or four weak unevenness of image density or line-shaped noise are observed in the image.

D: Though five or more unevenness of image density or line-shaped noise are observed in the image, the dark portion is four or less.

E: Five or more dark unevenness of image density or line-shaped noise are observed in the image.

The evaluation results are listed in Table 1.

It is clear from Table 1 that the radiation image conversion panels according to the invention are lower in the occurrence of the unevenness of image density and the line-shaped noise compared with the comparative radiation image conversion panels.

TABLE 1

| Panel No. | Protective film | Phosphor sheet | Mean slope Δa of outer surface of protective layer | Surface roughness Ra (μm) of inner side of the protective layer | Emitted light absorbing layer | Transmittance (%) | Sharpness (%) | Unevenness of image density, line-shaped noise Initial time | Unevenness of image density, line-shaped noise After 2 days at 80° C. | Remarks |
|---|---|---|---|---|---|---|---|---|---|---|
| 1 | 1 | *1 | 0.006 | 0.50 | Without | 99.5 | 61 | E | E | Comp. |
| 2 | 1 | *1 | 0.010 | 0.45 | Without | 99.5 | 64 | D | D | Inv. |
| 3 | 1 | *1 | 0.017 | 0.30 | Without | 99.5 | 64 | C | C | Inv. |
| 4 | 1 | *1 | 0.006 | 0.55 | With | 98.0 | 69 | D | E | Comp. |
| 5 | 1 | *1 | 0.010 | 0.45 | With | 98.0 | 75 | B | B | Inv. |
| 6 | 1 | *1 | 0.014 | 0.20 | With | 95.0 | 76 | A | A | Inv. |
| 7 | 1 | *1 | 0.019 | 0.40 | With | 90.0 | 79 | A | A | Inv. |
| 8 | 1 | *1 | 0.050 | 0.10 | With | 80.0 | 80 | A | A | Inv. |
| 9 | 1 | *1 | 0.100 | 0.05 | With | 70.0 | 81 | A | A | Inv. |
| 10 | 1 | *2 | 0.006 | 0.50 | With | 95.0 | 79 | C | D | Comp. |
| 11 | 1 | *2 | 0.017 | 0.30 | With | 95.0 | 80 | A | A | Inv. |
| 12 | 2 | *1 | 0.006 | 0.50 | Without | 99.5 | 62 | E | E | Comp. |
| 13 | 2 | *1 | 0.010 | 0.45 | Without | 99.5 | 65 | D | D | Inv. |
| 14 | 2 | *1 | 0.006 | 0.55 | With | 98.0 | 70 | D | E | Comp. |
| 15 | 2 | *1 | 0.010 | 0.45 | With | 98.0 | 77 | B | B | Inv. |
| 16 | 2 | *1 | 0.014 | 0.20 | With | 95.0 | 77 | A | A | Inv. |
| 17 | 2 | *1 | 0.019 | 0.40 | With | 90.0 | 80 | A | A | Inv. |
| 18 | 2 | *1 | 0.050 | 0.10 | With | 80.0 | 81 | A | A | Inv. |
| 19 | 2 | *1 | 0.100 | 0.05 | With | 70.0 | 82 | A | A | Inv. |

TABLE 1-continued

| Panel No. | Pro- tective film | Phosphor sheet | Mean slope Δa of outer surface of protective layer | Surface roughness Ra (μm) of inner side of the protective layer | Emitted light absorbing layer | Trans- mittance (%) | Sharp- ness (%) | Unevenness of image density, line-shaped noise | | Re- marks |
|---|---|---|---|---|---|---|---|---|---|---|
| | | | | | | | | Initial time | After 2 days at 80° C. | |
| 20 | 2 | *2 | 0.006 | 0.50 | With | 95.0 | 79 | C | D | Comp. |
| 21 | 2 | *2 | 0.017 | 0.30 | With | 95.0 | 81 | A | A | Inv. |

*1; Coating provided type
*2; Gas phase accumulation type
Comp.; Comparative
Inv.; Inventive

What is claimed is:

1. A radiation image conversion panel comprising a phosphor sheet having a stimulable phosphor layer and a protective layer provided so as to cover the surface of the phosphor layer, wherein mean slope Δa of an outer surface of the protective layer not adjacent with the phosphor layer is from 0.01 to 0.1 and the surface roughness Ra in μm of the inner side or the phosphor sheet side of the protective layer is 0.05 μm to 0.45 μm, and the stimulable phosphor layer is provided by a coating provided type.

2. The radiation image conversion panel of claim 1, wherein the protective layer comprises a stimulating light absorbing layer being colored to absorb the stimulating light.

3. The radiation image conversion panel of claim 1, wherein a binder to be used in the stimulable phosphor layer is selected from proteins such as gelatin, polysaccharide such as-dextrin, natural polymers such as gum arabic, and synthesized polymers such as poly(vinyl butyral), poly(vinyl acetate), nitrocellulose, ethyl cellulose, vinylidene chloride-vinyl chloride copolymer, poly(alkyl acrylate), poly(alkyl methacrylate), vinyl chloride-vinyl acetate copolymer, poly-urethane, cellulose acetate butylate, poly(vinyl alcohol) and linear polyester.

4. The radiation image conversion panel of claim 3, wherein the binder is selected from nitrocellulose, linear polyester, poly(alkyl acrylate), poly(alkyl methacrylate), a mixture of nitrocellulose and linear polyester, a mixture of nitrocellulose and poly(alkyl acrylate) or poly(alkyl meth-acrylate) and a mixture of polyurethane and poly(vinyl butyral).

5. The radiation image conversion panel of claim 1, wherein the ratio of the amount of the binder to be used in the stimulable phosphor layer to that of the stimulable phosphor is within the range of from 0.03 to 0.2 parts by weight per one part by weight of the stimulable phosphor.

6. The radiation image conversion panel of claim 1, wherein the panel is composed of the phosphor sheet cut into a designated size and moisture proof films provided on both sides of the phosphor sheet and the films are each substantially not adhered with the phosphor sheet and the circumferences thereof are arranged at the outside of the circumference of the phosphor sheet so as to cover the entire surface of the phosphor sheet.

7. A radiation image conversion panel comprising a phosphor sheet having a stimulable phosphor layer and a protective layer provided so as to cover the surface of the phosphor layer, wherein mean slope Δa of an outer surface of the protective layer not adjacent with the phosphor layer is from 0.01 to 0.1 and the surface roughness Ra in μm of the inner side or the phosphor sheet side of the protective layer is 0.05 μm to 0.45 μm, and the stimulable phosphor layer is provided by a gas phase accumulation type.

8. The radiation image conversion-panel of claim 7, wherein the protective layer comprises a stimulating light absorbing layer being colored to absorb the stimulating light.

9. The radiation image conversion panel of claim 7, wherein the stimulable phosphor constituting the stimulable phosphor layer is alkali halide type stimulable phosphor represented by Formula 1:

$$M1X \cdot aM2X'_2 \cdot bM3X''_3 : eA \qquad \text{Formula 1}$$

wherein M1 is an alkali metal selected from the group consisting of Li, Na, K, Rb and Cs; M2 is a divalent metal selected from the group consisting of Be, Mg, Ca, Sr, Ba, Zn, Cd, Cu and Ni; M3 is a trivalent metal selected from the group consisting of Sc, Y, La, Ce, Pr, Nd, Pm, Sm, Eu, Gd, Tb, Dy, Ho, Er, Tm, Yb, Lu, Al, Ga and In; X, X' and X" are each a halogen selected from the group consisting of F, Cl, Br and I; A is a metal selected from the group consisting of Eu, Tb, In, Cs, Ce, Tm, Dy, Pr, Ho, Nd, Yb, Er, Gd, Lu, Sm, Y, Tl, Na, Ag, Cu and Mg; and a, b and e are each a value within the range of $0 \leq a < 0.5$, $0 \leq b < 0.5$ and $0 < e \leq 0.2$, respectively.

10. The radiation image conversion panel of claim 9, wherein the stimulable phosphor constituting the stimulable phosphor layer is represented by Formula 2:

$$CsX:A \qquad \text{Formula 2}$$

in which X is Br or I, and A is Eu, In, Ga or Ce.

11. The radiation image conversion panel of claim 10, wherein the stimulable phosphor constituting the stimulable phosphor layer is CsBr type phosphor.

12. The radiation image conversion panel of claim 7, wherein the panel is composed of the phosphor sheet cut into a designated size and moisture proof films provided on both sides of the phosphor sheet and the films are each substantially not adhered with the phosphor sheet and the circumferences thereof are arranged at outside of the circumference of the phosphor sheet so as to cover the entire surface of the phosphor sheet.

* * * * *